United States Patent
Wasserman et al.

(10) Patent No.: US 7,289,692 B2
(45) Date of Patent: Oct. 30, 2007

(54) FIBER OPTIC CIRCUIT BOARD LINK

(75) Inventors: Shimon Wasserman, Haifa (IL); Ronen Betman, Haifa (IL)

(73) Assignee: Rafael - Armament Development Authority Ltd., Haifa (IL)

( * ) Notice: Subject to any disclaimer, the term of this patent is extended or adjusted under 35 U.S.C. 154(b) by 0 days.

(21) Appl. No.: 11/082,661

(22) Filed: Mar. 18, 2005

(65) Prior Publication Data

US 2005/0207694 A1 Sep. 22, 2005

(51) Int. Cl.
  *G02B 6/12* (2006.01)
  *G02B 6/26* (2006.01)
  *G02B 6/30* (2006.01)

(52) U.S. Cl. .............. 385/14; 385/15; 385/52; 385/88

(58) Field of Classification Search .......... 385/16, 385/17, 18, 19, 24, 25
See application file for complete search history.

(56) References Cited

U.S. PATENT DOCUMENTS

| | | | |
|---|---|---|---|
| 5,204,866 A | 4/1993 | Block et al. | |
| 5,359,683 A | 10/1994 | Pan et al. | |
| 5,493,437 A * | 2/1996 | Lebby et al. | 398/139 |
| 6,038,355 A | 3/2000 | Bishop | |
| 6,257,771 B1 * | 7/2001 | Okayasu | 385/89 |
| 6,577,793 B2 * | 6/2003 | Vaganov | 385/52 |
| 6,580,865 B1 | 6/2003 | Doorn | |
| 6,628,860 B1 * | 9/2003 | Van Doorn | 385/31 |
| 6,976,793 B2 * | 12/2005 | Tourne | 385/88 |
| 7,139,452 B2 * | 11/2006 | Mayer et al. | 385/24 |
| 2002/0030872 A1 | 3/2002 | Dair et al. | |
| 2002/0089709 A1 | 7/2002 | Mays | |
| 2002/0181058 A1 * | 12/2002 | Ger et al. | 359/163 |
| 2003/0081281 A1 | 5/2003 | Decusatis et al. | |
| 2003/0210869 A1 * | 11/2003 | Doorn | 385/53 |
| 2004/0102084 A1 * | 5/2004 | Bozso et al. | 439/501 |
| 2005/0031254 A1 * | 2/2005 | Schroeder | 385/17 |

* cited by examiner

*Primary Examiner*—Michelle R. Connelly-Cushwa
(74) *Attorney, Agent, or Firm*—Mark M. Friedman

(57) ABSTRACT

A device for fiber optic free-space optical communication between electronic components, having no physical communication connection, in which terminal ends of optical fibers are aligned such that light emitting from the terminal end of one optical fiber is transmitted across free-space and received by the terminal end of another optical fiber. The light thusly received is transmitted to a corresponding transceiver, to which the optical fiber is connected, deployed on the electronic component, thereby establishing optical communication between two transceivers across the free-space separating the two terminal ends.

15 Claims, 3 Drawing Sheets

FIBER OPTIC CIRCUIT BOARD LINK

FIELD AND BACKGROUND OF THE INVENTION

The present invention relates to optical bus systems and, in particular, it concerns a fiber optic free-space optical link.

It is known to employ optical buses to facilitate the high rate of data transferal required by some of the newer processing components. The issue of optical buses is relevant to new system with back planes designed specifically for such buses, as well as retrofitting or upgrading existing hard wired back planes using electronic buses.

U.S. Pat. No. 5,204,866 discloses an electronic system consisting of a number of subsystems or electronic components, which are connected by an optical bus. The individual electronic components are arranged in a housing in such a manner that optical interface units disposed on each component form a monoaxial, bidirectional optical bus working in free-space which distributes electrical signals among the individual components. These signals are transmitted along a single linear axis as polarized light beams. Here each individual component has a bus interface unit for generating outgoing light beams and receiving incoming beams along both directions of the axis respectively. The interface units use laser generators, photodetectors and amplitude-beam-splitters.

In spite of an improvement in the technique, however, such systems are still cost-intensive and only allow for compact construction to a very limited extent, since each individual component requires optical interface units. Furthermore, systems of this type display lower reliability due to the large number of optical elements used. It should also be noted that this type of system is better suited for new systems, since it would be difficult to retrofit an existing system with appropriately aligned housings due to height and location problems created by the existing electronically licked boards.

U.S. Pat. No. 6,038,355 discloses an optical bus between circuit boards or other devices. The system features an electronic circuit assembly that includes electrical circuitry associated with two beam splitters having different optical axes, a detector responsive to one optical axis, and an optical output configured for optical input on the other optical axis.

U.S. patent application Ser. No. 2003/0081281 concerns a Wavelength Division Multiple Access (WDMA) free-space broadcast technique for optical backplanes and interplanar communications for providing free-space optical interconnects between multiple circuit cards in a computer system or networking device. It is intended to provide a stable, optimal alignment between a laser center wavelength and the center of a Gaussian bandpass filter in order to optimize power transmission through free-space and reduce optical crosstalk interference in optical networks.

Although the systems referred to above may function as intended when deployed as per design specifications, they do not address the issue of functionality when alternative deployment is required, such as during debugging of the system or an individual board. That is, the required optical alignment is attainable only when the board is in a "normal" deployment on the backplane.

U.S. Pat. No. 6,580,865 offers a system by which individual boards are placed in optical communication by stringing one or more optical fibers from one board to the next. Several boards along a backplane are thus interconnected in series. Although not specifically mentioned in the document, it will be obvious to one skilled in the art that an unintended side benefit of this system in the ability to debug components while they are out of their normal position on the backplane. Drawbacks to this system, however, include being deployable only in systems which have enough room for the user to physically maneuver so as to attached the optical fibers in their receptacles, and the time required to perform detachment and attachment of fibers when a component board is replaced.

In some applications, although the need to replace boards is infrequent, when it is required speed is of the essence. Such applications may include aviation on-board flight control system, ground based flight tracking systems, military applications such as high technology weaponry and detection systems, to specify a few.

There is therefore a need for a fiber optic free-space optical link in which data is transmitted through free-space between open ends of optical fibers.

SUMMARY OF THE INVENTION

The present invention is a fiber optic free-space optical link.

According to the teachings of the present invention there is provided, a device for fiber optic free-space optical communication between electronic components, the device comprising: (a) at least a first electronic component including: (i) at least a first fiber optic transceiver; (ii) at least a first optical fiber having a connection end that is connected to the first fiber optic transceiver and a first terminal free-end; and (iii) at least a first alignment mechanism configured to support the first optic fiber and align the first terminal free-end; and (b) at least a second electronic component including: (i) at least a second fiber optic transceiver; (ii) at least a second optical fiber having a connection end that is connected to the second fiber optic transceiver and a second terminal free-end; and (iii) at least a second alignment mechanism configured to support the second optic fiber and align second the terminal free-end; wherein, when the first and the second electronic components are deployed, the first and the second terminal free-ends are aligned such that light emitting from one of the first and the second terminal free-ends is received by the other of the first and the second terminal free-ends, and thereby transmitted to a corresponding one of the first and the second transceivers, thereby establishing optical communication between the first and the second transceivers across the free-space separating the first and the second terminal free-ends.

According to a further teaching of the present invention, the first and the second electronic components are circuit boards.

According to a further teaching of the present invention, the first and the second electronic components are deployed on a backplane.

According to a further teaching of the present invention, at least one of the first and the second electronic components is deployed other than on a backplane.

According to a further teaching of the present invention, there is also provided at least a third optic transceiver and a third optic fiber, the third optic transceiver being deployed on one of the first and the second electronic components, and a third terminal free-end of the third optic fiber is aligned with a terminal free-end of a fourth optic fiber associated with a fourth fiber optic transceiver deployed on a third electronic component.

According to a further teaching of the present invention, the first and the second electronic components are circuit boards and the third optic fiber passes through a hole in the circuit board.

According to a further teaching of the present invention, the first fiber optic transceiver includes a releasable connector to facilitate the connect with the first optical fiber and the second fiber optic transceiver includes a releasable connector to facilitate the connect with the second optical fiber.

According to a further teaching of the present invention, the optical communication is established between the first and the second electronic components when one of the first and the second electronic components is operated outside of a normal deployment position in which the alignment is not attained, the optical communication being by direct interconnection of the first and the second transceivers by at least one continuous optical fiber.

There is also provided according to the teachings of the present invention, a method of upgrading an electronics system to provide data transfer rates between circuit boards greater than data transfer rates supported by an existing backplane, the method comprising: (a) deploying at least a first electronic component on the backplane, the first electronic component including: (i) at least a first fiber optic transceiver; (ii) at least a first optical fiber having a connection end that is connected to the first fiber optic transceiver and a first terminal free-end; and (iii) at least a first alignment mechanism configured to support the first optic fiber and align the first terminal free-end; (b) deploying at least a second electronic component on the backplane, the second electronic component including: (i) at least a second fiber optic transceiver; (ii) at least a second optical fiber having a connection end that is connected to the second fiber optic transceiver and a second terminal free-end; and (iii) at least a second alignment mechanism configured to support the second optic fiber and align second the terminal free-end; (c) establishing at least a first optical communication between the first and the second transceivers across the free-space separating the first and the second terminal free-ends by: (i) aligning the first and the second terminal free-ends such that light emitting from one of the first and the second terminal free-ends is received by the other of the first and the second terminal free-ends; and (ii) transmitting the light to a corresponding one of the first and the second transceivers.

According to a further teaching of the present invention, the first and the second electronic components are implemented as circuit boards.

According to a further teaching of the present invention, There is also provided positioning the first and the second terminal free-ends performed prior to deployment of the first and the second electronic components on the backplane, such that the alignment is performed by deployment of the first and the second electronic components on the backplane.

According to a further teaching of the present invention, There is also provided: (a) deploying at least a third optic transceiver, at least a third optic fiber and at least a third alignment mechanism, on one of the first and the second electronic components, the third optic fiber including a third terminal free-end; (b) deploying at least a fourth fiber optic transceiver, at least a fourth optic fiber and at least a fourth alignment mechanism, on at least a third electronic component, the fourth optic fiber including a fourth terminal free-end; and (c) establishing at least a second optical communication between the third and the fourth transceivers across the free-space separating the third and the fourth terminal free-ends by: (i) aligning the third and the fourth terminal free-ends such that light emitting from one of the third and the fourth terminal free-ends is received by the other of the third and the fourth terminal free-ends; and (ii) transmitting the light to a corresponding one of the third and the fourth transceivers.

According to a further teaching of the present invention, the first and the second electronic components are implemented as first and second circuit boards and passing the third optic fiber through a hole in one of the first and the second circuit boards.

According to a further teaching of the present invention, there is also provided, providing the first fiber optic transceiver with a releasable connector to facilitate the connect with the first optical fiber and providing the second fiber optic transceiver with a releasable connector to facilitate the connect with the second optical fiber.

According to a further teaching of the present invention, there is also provided establishing the at least a first optical communication when one of the first and the second electronic components is operated outside of a normal deployment position in which the alignment is not attained, the at least a first optical communication being by direct interconnection of the first and the second transceivers by at least one continuous optical fiber.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a fiber optic free-space optical link.

The principles and operation of a fiber optic free-space optical link according to the present invention may be better understood with reference to the drawings and the accompanying description.

By way of introduction, the phrase "free-space optical communication" refers to the use of spaced apart optical links to communicate across the open space between the optical links; therefore the term "free-space" as used herein refers to the open, or free, space by which the links are separated. The fiber optical links of the present invention provide optical communication between juxtaposed terminal ends of optical fibers that are supported so as to extend freely from the electrical component with which the link is associated. Herein, such optical fiber terminal ends are referred to as "terminal free-ends." Therefore, no physical communication connection is required for communication between electronic components configured with fiber optic free-space optical links of the present invention. A further advantage of the present invention is that the transceivers, optical fibers and optical fiber connectors of the present invention may be implemented from off-the-shelf components, which are inexpensive and readily available.

For the ease of discussion, the present invention will be described herein with regard to circuit boards that are deployed on a backplane; however, this is not intended as a limitation, but rather as a non-limiting example of an electronic component suited for use with the fiber optical links of the present invention. It should be noted that within the application of circuit boards, the fiber optical links of the present invention are well suited for use both in systems using only this fiber optical bus system, and as an upgrade in systems designed for electronic buses. When deployed within a system using such fiber optical links, there need not be any physical communication connection between circuit boards. When deployed as an upgrade, the board may be configured to transmit and receive data solely via the fiber optical link or through both the fiber optical link and the backplane via the electronic bus of the existing system.

Figure 1:
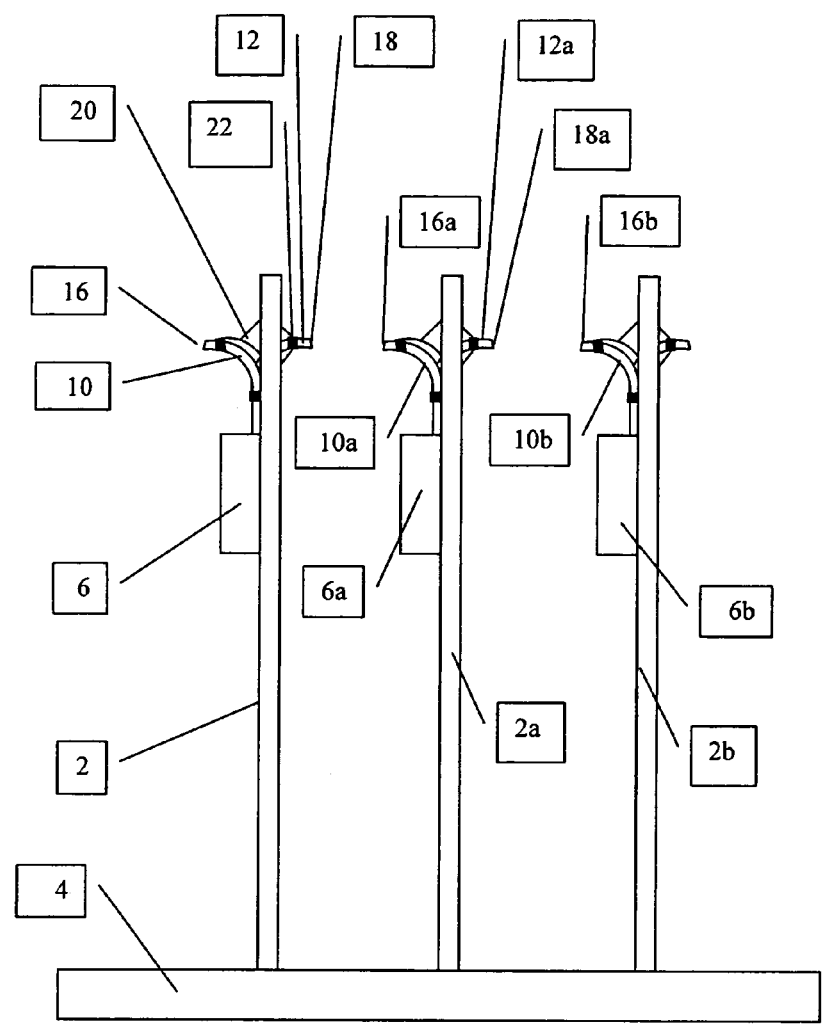
FIG. 1 is a schematic side elevation of three circuit boards configured with fiber optical links constructed and operative according to the teachings of the present invention.
Figure 2:
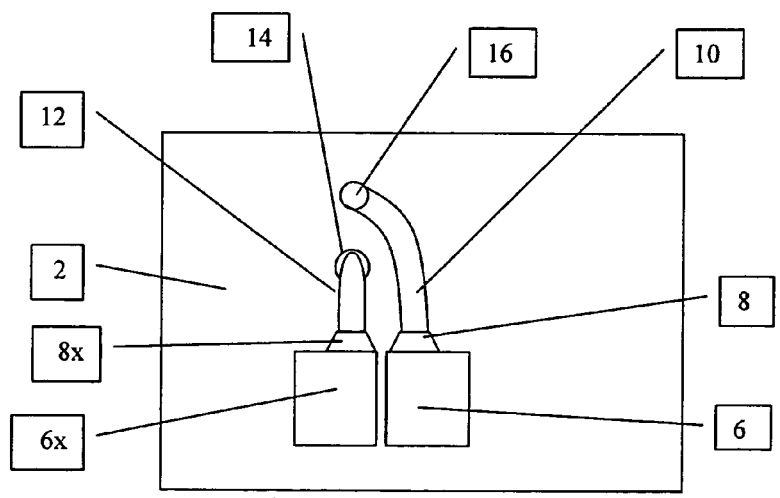
FIG. 2 is a schematic front elevation of one fiber optical link of FIG. 1.

Referring now to the drawings, FIGS. 1 relates to a first preferred embodiment of the present invention configured on circuit boards 2 deployed in normal positions on a backplane 4. As seen in better detail in FIG. 2, the fiber optical link includes a fiber optic transceiver 6 having industry standard fiber optic releasable connectors 8. Connected to, and extending from, the connector 8 is a segment of optical fiber. Optical fiber 10 extends outwardly from the board 2 and is supported by the alignment mechanism 20, which is configured to support and direct the alignment of the terminal free-end 16 of the optical fiber 10. For optical communication in the opposite direction, fiber optic transceiver 6x includes a releasable connector 8x and optical fiber 12 that passes through a hole in board 2 and extends outwardly from board 2 in a direction substantially opposite from the extension direction of optical fiber 10. Optical fiber 12 is supported by the alignment mechanism 22, which is configured to support and direct the alignment of the terminal free-end 18 of the optical fiber 12. It should be noted that optical fiber 12 need not be limited to passing through a hole in the board. Alternatively, the alignment mechanisms may be configured to support the optical fibers so as to extend beyond an edge of the board 2.

Circuit boards 2a and 2b are similarly configured. In this preferred embodiment, each of the alignment mechanisms is configured to support its associated optic fiber in a predetermined alignment such that once the boards are deployed in normal positions on the backplane 4, as illustrated in FIG. 1, the corresponding optical fiber terminal free-ends are aligned one with another. That is, terminal free-end 18 of optical fiber 12 is aligned with terminal free-end 16a of optical fiber 10a and terminal free-end 18a of optical fiber 12a is aligned with terminal free-end 16b of optical fiber 10b. Therefore, a communication initiated by transmitter 6, for example is directed through optical fiber 12 and light emits from terminal free-end 18. The light is received by terminal free-end 16a, and thereby transmitted to corresponding transceiver 6a. Thus, optical communication is established between transceivers 6 and 6a across the free-space separating the terminal free-ends 18 and 16a. Any data intended for board 2a is relayed by transceiver 6a to transceiver 6y (view obscured by transceiver 6a) and in turn transmitted to transceiver 6b by a similar process. As mentioned above, when circuit boards having the fiber optical links of the present invention are deployed as an upgrade component on an electronic backplane, the optically linked components may perform all or at least some communication without using the backplane circuitry. This has several benefits to the system, including the faster data transmission required by the new components that is not available through the backplane, and since there are now fewer components using the backplane, the existing system may perform data transfer on the electronic bus will incur less data traffic, and therefore may handle that lower amount of data in a more efficient manner.

It should be noted that circuit boards configured with the fiber optical links of the present invention do not require any physical connectors to provide data communication, and therefore may be quickly and easily replaced. Replacement of boards is accomplished by merely disconnecting the board from the backplane, or other point of attachment. Placement of the new board requires only that the new board by connected to the backplane, or other point of attachment, in a normal manner. Alignment tolerances of the present invention are such that normal board placement tolerances are substantially sufficient to attain optical alignment of the fiber optical links. The alignment mechanisms 20 and 22 are configured to hold the corresponding optical fibers 10 and 12 in a proper predetermined alignment. The alignment mechanisms 20 and 22 may be substantially ridged so as to maintain a preset "standard" alignment angle, thereby facilitating replacement or addition of boards. Alternatively, the alignment mechanisms 20 and 22 may be configured so as to be adjustable such that "custom" alignment deployments may be set after the board is deployed in the system. This may be particularly advantageous in systems having banks of board slots arranged at an angle to each other, such as board 6b in FIG. 4. For this deployment, alignment mechanism 20c supports optic fiber 10c in alignment with optic fiber 12b extending from board 2b. Thus, a fiber optical link on a board deployed in one bank may be aligned with a fiber optical link on a board deployed on the other bank, thereby by establishing fiber optical communication between substantially all the optically linked boards in both banks. Such banks may be configured in a single backplane, or, as illustrated in FIG. 4, two backplanes, 4 and 4a, deployed in the same system.

Figure 3:
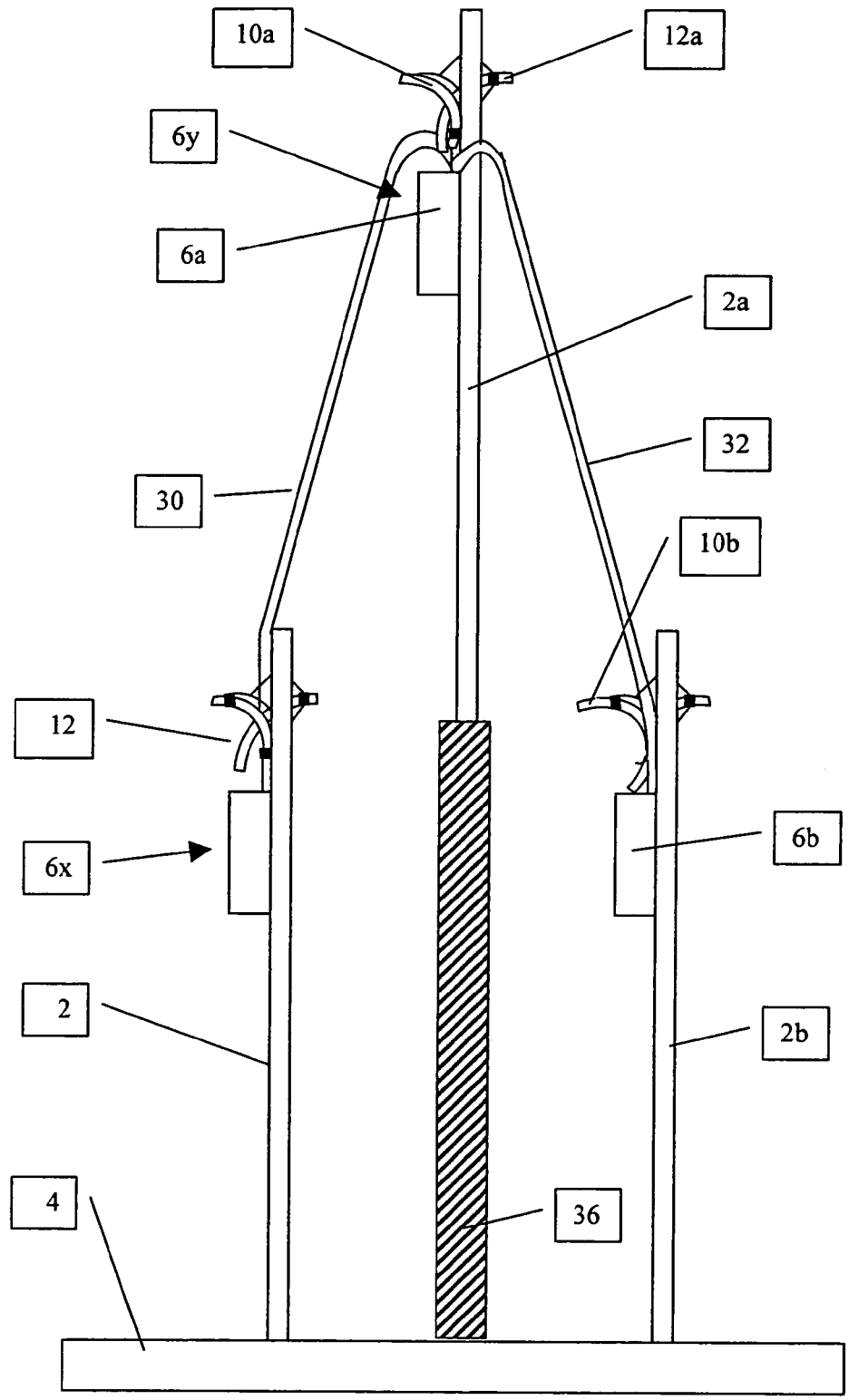
FIG. 3 is a schematic side elevation of three circuit boards of FIG. 1 deployed for diagnostic or debugging procedures.

As illustrated in FIG. 3, during diagnostic or debugging procedures, a component, as represented in FIG. 3 by board 2a, may be extended from the backplane by, for example, a board extension 36 to enable a technician to access the circuitry of the board. Such practice is well known in the art with relation to "conventional" backplanes having electronic bus systems. It is difficult or even impossible, however, to perform this operation with some other optical buses know in the art. With the fiber optical links of the present invention, however, the transceivers 6x and 6a may be directly interconnected by continuous optical fiber 30 and transceivers 6y and 6b may be directly interconnected by continuous optical fiber 32 when diagnostic or debugging procedures require that a board, such as board 6a, be positioned out of optical alignment with corresponding boards, for example 6 and 6c. Once the diagnostic or debugging procedure is completed, the continuous optical fibers 30 and 32 are replaced with original optical fiber segments, the board extension 36 is removed, and the board 6a is reconnected to the backplane 4. Disconnected optic fiber segments 12, 10a, 12a and 10b may be left hanging in place, as illustrated here, or completely removed during the diagnostic or debugging procedure.

Figure 4:
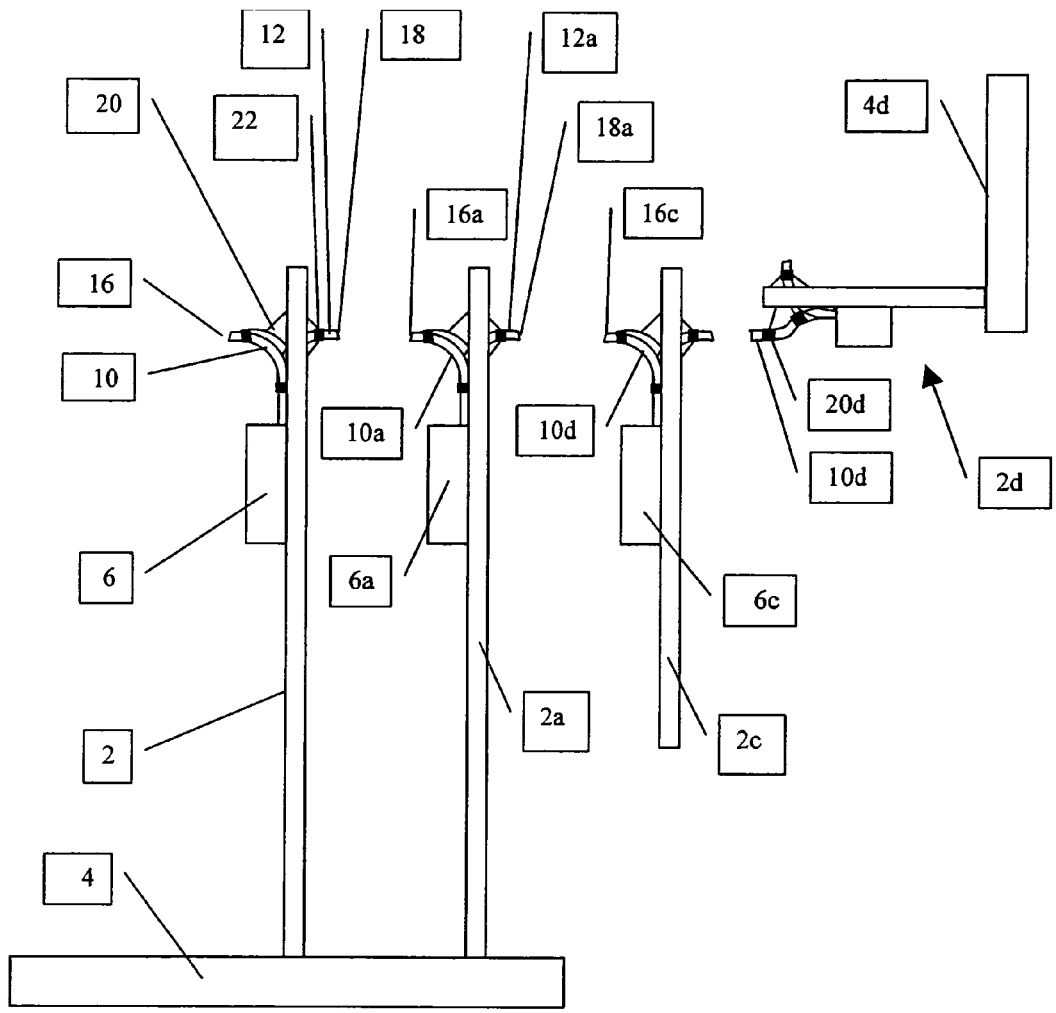
FIG. 4 is a schematic side elevation of fiber optical links constructed and operative according to the teachings of the present invention deployed on circuit boards that are deployed on a backplane, deployed other than on a backplane, and deployed at an angle to each other.

FIG. 4 is similar to FIG. 1, and identical elements are numbered the same. As illustrated in FIG. 4, fiber optical links of the present invention may be used to establish optical communication between boards deployed on the backplane, such as board 2a and boards deployed other than on the backplane, such as board 2*c*. Further, as illustrated by board 2*d*, the alignment mechanism of the present invention may be configured to support and align the terminal free-end of an optical fiber segment at substantially any angle necessary. As illustrated here, alignment mechanism 20*d* is configured to align the terminal free-ends of optical fibers 12*c* and 10*c*, even though boards 2*c* and 2*d* are deployed at an angle to each other. It should be noted that although the angle illustrated here is 90°, this is intended as a non-limiting example and substantially any angle of deployment between two electronic components may be compensated for and alignment of the optical fibers, and therefore optical communication, may be achieved. Further, while board 2*d* is shown deployed on backplane 4*d*, this need not be the case, and board 2*d* may also be deployed other than on a backplane as is board 2*c*.

Although the description herein relates to transceivers dedicated to a single optic fiber, it will be readily appreciated that using transceivers with two or more optical fiber connections associated with the appropriate number of optical fibers and alignment mechanisms is within the scope of the present invention. Such transceivers may be deployed on one, some or all of the electronic components associated with the system. Therefore, an upgraded system with a mixture of boards communicating: solely through the backplane; optically with single-fiber dedicated transceivers solely and in combination with the backplane; and optically with multi-fiber transceivers solely and in combination with the backplane, is fully within the scope of the present invention.

It will be appreciated that since circuit boards configured with fiber optical links of the present invention do not communicate via a backplane or other physical communication connection, a system in which circuit boards are deployed off the backplane is possible. This is of particular advantage in applications where design requirements and space limitations impact control system configuration. A non-limiting example may be guided missiles, where aerodynamics and missile size are of the utmost importance.

It will be appreciated that the above descriptions are intended only to serve as examples and that many other embodiments are possible within the spirit and the scope of the present invention.

What is claimed is:

1. A device for fiber optic free-space optical communication between electronic components, the device comprising:
   a) at least a first electronic component including:
      i) at least a first fiber optic transceiver;
      ii) at least a first optical fiber having a connection end that is connected to said first fiber optic transceiver and a first terminal free-end; and
      iii) at least a first alignment mechanism configured so as to maintain a preset alignment angle and to support said first optic fiber and align said first terminal free-end to said preset alignment angle; and
   b) at least a second electronic component including:
      i) at least a second fiber optic transceiver;
      ii) at least a second optical fiber having a connection end that is connected to said second fiber optic transceiver and a second terminal free-end; and
      iii) at least a second alignment mechanism configured so as to maintain a preset alignment angle and to support said second optic fiber and align said second terminal free-end to said preset alignment angle;
   wherein, no physical communication connection is required for communication between said first and said second electronic components when said first and said second electronic components are deployed, since said first and said second terminal free-ends are aligned such that light emitting from one of said first and said second terminal free-ends is received by the other of said first and said second terminal free-ends, and thereby transmitted to a corresponding one of said first and said second transceivers, thereby establishing optical communication between said first and said second transceivers across the free-space separating said first and said second terminal free-ends.

2. The device of claim 1, wherein said first and said second electronic components are circuit boards.

3. The device of claim 2, wherein said first and said second electronic components are deployed on a backplane.

4. The device of claim 1, wherein at least one of said first and said second electronic components is deployed other than on a backplane.

5. The device of claim 1, further including at least a third optic transceiver and a third optic fiber, said third optic transceiver being deployed on one of said first and said second electronic components, and a third terminal free-end of said third optic fiber is aligned with a terminal free-end of a fourth optic fiber associated with a fourth fiber optic transceiver deployed on a third electronic component.

6. The device of claim 5, wherein said first and said second electronic components are circuit boards and said third optic fiber passes through a hole in said circuit board.

7. The device of claim 1, wherein said first fiber optic transceiver includes a releasable connector to facilitate said connect with said first optical fiber and said second fiber optic transceiver includes a releasable connector to facilitate said connect with said second optical fiber.

8. The device of claim 7, wherein said optical communication is established between said first and said second electronic components when one of said first and said second electronic components is operated outside of a normal deployment position in which said alignment is not attained, said optical communication being by direct interconnection of said first and said second transceivers by at least one continuous optical fiber.

9. A method of upgrading an electronics system to provide data transfer rates between circuit boards greater than data transfer rates supported by an existing backplane, the method comprising:
   a) deploying at least a first electronic component on the backplane, said first electronic component including:
      i) at least a first fiber optic transceiver;
      ii) at least a first optical fiber having a connection end that is connected to said first fiber optic transceiver and a first terminal free-end; and
      iii) at least a first alignment mechanism configured so as to maintain a preset alignment angle and to support said first optic fiber and align said first terminal free-end to said preset alignment angle;
   b) deploying at least a second electronic component on the backplane, said second electronic component including:
      i) at least a second fiber optic transceiver;
      ii) at least a second optical fiber having a connection end that is connected to said second fiber optic transceiver and a second terminal free-end; and
      iii) at least a second alignment mechanism configured so as to maintain a preset alignment angle and to support said second optic fiber and align second said terminal free-end to said preset alignment angle;
   c) establishing at least a first optical communication between said first and said second transceivers such that no physical communication connection is required for communication between said first and said second electronic components, said at least a first optical communication being across the free-space separating said first and said second terminal free-ends by:
 i) aligning said first and said second terminal free-ends such that light emitting from one of said first and said second terminal free-ends is received by the other of said first and said second terminal free-ends; and
 ii) transmitting said light to a corresponding one of said first and said second transceivers.

10. The method of claim 9, wherein said first and said second electronic components are implemented as circuit boards.

11. The method of claim 9, further including positioning said first and said second terminal free-ends performed prior to deployment of said first and said second electronic components on the backplane, such that said alignment is performed by deployment of said first and said second electronic components on the backplane.

12. The method of claim 9, further including:
 a) deploying at least a third optic transceiver, at least a third optic fiber and at least a third alignment mechanism, on one of said first and said second electronic components, said third optic fiber including a third terminal free-end;
 b) deploying at least a fourth fiber optic transceiver, at least a fourth optic fiber and at least a fourth alignment mechanism, on at least a third electronic component, said fourth optic fiber including a fourth terminal free-end; and
 c) establishing at least a second optical communication between said third and said fourth transceivers across the free-space separating said third and said fourth terminal free-ends by:
  i) aligning said third and said fourth terminal free-ends such that light emitting from one of said third and said fourth terminal free-ends is received by the other of said third and said fourth terminal free-ends; and
  ii) transmitting said light to a corresponding one of said third and said fourth transceivers.

13. The method of claim 12, wherein said first and said second electronic components are implemented as first and second circuit boards and passing said third optic fiber through a hole in one of said first and said second circuit boards.

14. The method of claim 9, further including providing said first fiber optic transceiver with a releasable connector to facilitate said connect with said first optical fiber and providing said second fiber optic transceiver with a releasable connector to facilitate said connect with said second optical fiber.

15. The method of claim 14, further including establishing said at least a first optical communication when one of said first and said second electronic components is operated outside of a normal deployment position in which said alignment is not attained, said at least a first optical communication being by direct interconnection of said first and said second transceivers by at least one continuous optical fiber.

* * * * *

UNITED STATES PATENT AND TRADEMARK OFFICE
CERTIFICATE OF CORRECTION

| | |
|---|---|
| PATENT NO. | : 7,289,692 B2 |
| APPLICATION NO. | : 11/082661 |
| DATED | : October 30, 2007 |
| INVENTOR(S) | : Shimon Wasserman and Ronen Betman |

It is certified that error appears in the above-identified patent and that said Letters Patent is hereby corrected as shown below:

Title Page:

Item [30]

The related IL Application Data: IL 160952 filed on 18 March 2004 should be inserted.

Signed and Sealed this

Twentieth Day of May, 2008

JON W. DUDAS
*Director of the United States Patent and Trademark Office*